2,897,204

Patented July 28, 1959

2,897,204

SUBSTITUTED PIPERIDINES AND METHODS FOR MAKING SAME

Frank A. Cutler, Jr., Westfield, and John M. Chemerda, Metuchen, N.J., assignors to Merck & Co., Inc., Rahway, N.J., a corporation of New Jersey No Drawing. Application July 15, 1957
Serial No. 671,699

13 Claims. (Cl. 260—294.3)

This invention relates to new heterocyclic compounds. More particularly, it relates to new substituted piperidines. Still more specifically, it is concerned with 1-[2-(p-substituted phenyl)-2-alkoxyethyl]-4-carbo-loweralkoxy-4-phenylpiperidines, acid addition salts thereof and with methods for making such compounds.

The compounds of our invention may be illustrated by the structural formula:

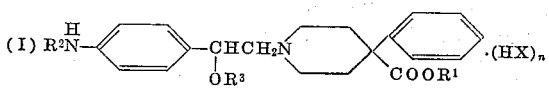

wherein $R^1$ and $R^3$ are lower alkyl, $R^2$ is hydrogen or a lower acyl radical, HX is an acid and $n$ is a whole integer having a value of 0 to 2.

These new products are prepared by treating 1-[2-(p-substituted phenyl)-2-hydroxyethyl]-4-carbo-loweralkoxy piperidines, i.e. compounds of the above formula wherein $R^3$ is hydrogen, with an alcohol in the presence of a strong acid. Examples of alcohols suitable for use in this reaction are the lower alkanols such as methanol, ethanol, propanol, isopropanol, butanol and the like. The hydrocarbon moiety of the ether thus obtained will correspond to that of the alkanol employed so that $R^3$ in the above formula may be varied as desired by carrying out the process in the appropriate alcoholic solvent. The complication of possible ester interchange between the alcoholic solvent and the carboxylic acid ester group attached to the piperidine ring is avoided when the lower alkanol employed is the same as the alkanol moiety of the carboxylic acid ester. In the preferred embodiment of our invention, therefore, $R^1$ and $R^3$ of Formula I above and in the following flow diagram are the same.

The process of the invention may then be expressed by the flow sheet:

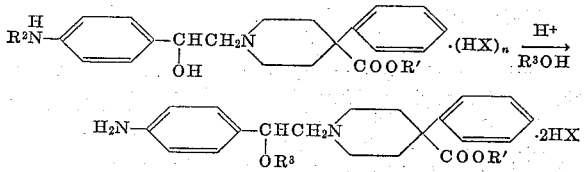

wherein $R^1$, $R^2$, $R^3$, HX and $n$ have the meaning set forth above for Formula I.

In carrying out our process the 1-[2-(p-substituted phenyl)-2-hydroxyethyl]-4-carbo-loweralkoxy-4-phenylpiperidine is dissolved in the lower alkanol and the mixture heated in the presence of a strong acid for about 10-20 hours. Reaction temperatures of about 50-120° C. and preferably of about 75-100° C. are employed.

In a specific embodiment of this process 1-[2-(p-aminophenyl-2-ethoxyethyl]-4-carbethoxy-4-phenyl-piperidine is obtained by heating an ethanolic solution of 1-[2-(p-acetamidophenyl)-2-hydroxyethyl]-4-carbethoxy-4-phenylpiperidine in the presence of concentrated sulfuric acid. The mixture is warmed at about 80° C. for 15-20 hours. The ether is present in the reaction mixture as the sulfate salt.

The acid used as catalyst in our process is preferably a strong non-oxidizing mineral acid. Sulfuric acid is the acid of choice although other strong acids such as hydrochloric, hydrobromic or perchloric are satisfactory and may be employed if desired.

It will be noted that during the etherification reaction, an acylamino substituent in the para position of the phenyl residue will, if present, be hydrolyzed to the parent primary amino group. This is not unexpected in view of the strongly acidic reaction medium required to form the ether. When the acylamino derivative of the ether is desired (Formula I where $R^2$ is lower acyl) it can be prepared from the parent amine by warming the amine with an excess of an acylating agent such as a lower fatty acid anhydride or a mixture of lower fatty acid halide and pyridine. In this fashion the formamido, acetamido, propionamido and other lower acylamino derivatives of 1-[2-(p-aminophenyl)-2-loweralkoxyethyl]-4-carbo-loweralkoxy-4-phenylpiperidines are obtained.

Typical examples of the new substituted piperidines obtainable by the process of this invention are—

1-[2-(p-aminophenyl)-2-ethoxyethyl] - 4 - carbethoxy-4-phenylpiperidine
1-[2-(p-aminophenyl)-2-methoxyethyl] - 4 - carbomethoxy-4-phenylpiperidine
1-[2-(p-acetamidophenyl) - 2 - ethoxyethyl] - 4 - carbethoxy-4-phenylpiperidine
1-[2-(p-formamidophenyl)-2-ethoxyethyl - 4 - carbethoxy-4-phenylpiperidine
1-[2-(p-aminophenyl) - 2 - propoxyethyl] - 4 - carbopropoxy-4-phenylpiperidine
1-[2-(p-acetamidophenyl)-2-methoxymethyl] - 4 - carbomethoxy-4-phenylpiperidine These substances are present in the finished reaction mixture in the form of acid addition salts. In order to isolate them in high yield and purity, it is preferred to neutralize the reaction mixture and isolate the free base initially. Any desired acid addition salt is then readily prepared from the free base. Typical acid addition salts are the hydrochloride, hydrobromide, sulfate, phosphate, citrate, tartrate and the like.

These new compounds of Formula I above have analgesic activity and may be administered orally in the form of capsules, compressed tablets or elixirs or subcutaneously in sterile solutions.

The 1-[2-(p-substituted phenyl)-2-hydroxyethyl] - 4 - carbo-loweralkoxy-4-phenylpiperidines employed as starting materials in our process are obtained by condensation of a p-acylaminophenacyl halide with a 4-carboloweralkoxy-4-phenylpiperidine and subsequent reduction of the 1-(p-acylaminophenacyl)-4-carbo-loweralkoxy-4-phenylpiperidine with an alkali metal borohydride. If desired, the acylamino group may be hydrolyzed to the primary amine before the etherification step. It is equally convenient, however, and is a preferred embodiment of the invention to effect such hydrolysis during the etherification reaction. For example, one of the preferred aspects of our invention is the preparation of 1-[2-(p-aminophenyl) - 2 - ethoxyethyl] - 4 - carbethoxy-4-phenylpiperidine from 1-[2-(p-aminophenyl)-2-hydroxyethyl]-4-carbethoxy-4-phenylpiperidine or from 1-[2-(p-lower-acylamidophenyl)-2-hydroxyethyl] - 4 - carbethoxy-4-phenylpiperidine. These latter compounds are readily prepared by reacting together p-lower-acylamidophenacyl chloride and 4-carbethoxy-4-phenylpiperidine, and reducing the resulting product with sodium borohydride as described in the detailed examples hereinbelow.

The synthesis of 1-[2-(p-substituted phenyl)-2-hydroxyethyl]-4-carbo-loweralkoxy - 4 - phenylpiperidine is not a part of the present invention, but is rather the invention of one of us together with certain of our colleagues. This separate invention is claimed in a patent application filed on even date herewith.

The following examples are given for purposes of illustration and not by way of limitations:

EXAMPLE 1

*1-[2-(p-aminophenyl)-2-ethoxyethyl]-4-carbethoxy-4-phenylpiperidine*

A solution of one gram of 1-[2-(p-acetamidophenyl)-2 - hydroxyethyl] - 4 - carbethoxy - 4 - phenylpiperidine in 12.5 cc. of absolute ethanol and 1.0 cc. of sulfuric acid is heated at the reflux temperature for 17 hours. The solution is cooled, dilute sodium hydroxide added until the pH exceeds 10, and water added to a total volume of about 40 ml. After several hours' cooling in ice, 1 - [2 - p - aminophenyl) - 2 - ethoxyethyl - 4-carbethoxy-4-phenylpiperidine crystallizes as plates. The crystals, melting point ca 103° C., are collected and without drying dissolved in 8 ml. of warm alcohol. Two-tenths grams of decolorizing charcoal is added and after a brief aging period is removed by filtration. The filtrate, together with a wash of 2 ml. of ethanol is diluted with 20 ml. of water, and the resulting suspension chilled, whereupon 1 - [2 - (p - aminophenyl) - 2 - ethoxyethyl] - 4 - carbethoxy - 4 - phenylpiperidine crystallizes. Two additional recrystallizations in a similar manner gives 1 - [2 - (p - aminophenyl) - 2 - ethoxyethyl]-4-carbethoxy-4-phenylpiperidine, melting point 101.5–106° C.

EXAMPLE 2

*1-[2-(p-aminophenyl)-2-ethoxyethyl]-4-carbethoxy-4-phenylpiperidine*

A solution of five grams of 1-[2-(p-acetamidophenyl)-2 - hydroxyethyl - 4 - carbethoxy - 4 - phenylpiperidine in 62.5 cc. of absolute ethanol and 5 cc. of sulfuric acid is refluxed for 17.5 hours. The solution is then allowed to cool, made alkaline with excess 10% sodium hydroxide solution and diluted to a volume of 250 ml. with water. The resulting suspension of crystals of 1-[2 - (p - aminophenyl) - 2 - ethoxyethyl] - 4 - carbethoxy - 4 - phenylpiperidine is chilled to 5° C., filtered, washed with water, and dried. The product melts at 100.5–103.5° C.

EXAMPLE 3

*1-[2-(p-acetamidophenyl)-2-ethoxyethyl]-4-carbethoxy-4-phenylpiperidine*

To one gram of 1-[2-(p-aminophenyl)-2-ethoxyethyl]-4-carbethoxy-4-phenylpiperidine is added 5 cc. of acetic anhydride. The resulting solution is warmed on the steam bath for 30 minutes, cooled and diluted with 25 cc. of water. After a few minutes' standing, the turbid solution is made alkaline with excess 10% sodium hydroxide solution, causing separation of the base as an oil. The base is extracted into ether and soon begins to crystallize from the ether. The ether is allowed to evaporate, leaving a crystalline residue of 1-[2-(p-acetamidophenyl) - 2 - ethoxyethyl] - 4 - carbethoxy - 4-phenylpiperidine, melting point 143–148° C. The crystals are dissolved in 5 ml. of warm ethanol, 0.1 gram of decolorizing charcoal added, and after a few minutes, the charcoal is removed by filtration and washed with 5 ml. of ethanol. The combined filtrate and wash is diluted with 20 ml. of water and the resulting suspension of crystals chilled and filtered. The product is washed with cold 1:2 ethanol:water and dried. It melts at 146–148° C.

EXAMPLE 4

*1-(p-acetamidophenacyl)-4-carbethoxy-4-phenylpiperidine*

A mixture of 23.3 grams of 4-carbethoxy-4-phenylpiperidine carbonate, 19.9 grams of p-acetamidophenacyl chloride, 30.9 grams of sodium bicarbonate and 276 ml. of absolute ethanol is heated at the reflux temperature with agitation for four hours. The hot mixture is then filtered to free it from inorganic salts and the salt cake washed with two 20 ml. portions of hot ethanol. The combined filtrate and washes are chilled to 0° C., depositing crystals of 1-(p-acetamidophenacyl)-4-carbethoxy-4-phenylpiperidine. These are collected, washed with cold ethanol and dried. Upon recrystallization from absolute ethanol the material melts at 149–157° C.

EXAMPLE 5

*1-(p-aminophenacyl)-4-carbethoxy-4-phenylpiperidine*

Five grams of 1-(p-acetamidophenacyl)-4-carbethoxy-4-phenylpiperidine, dissolved in a mixture of 62.5 ml. of absolute ethanol and 5 ml. of concentrated sulfuric acid, is heated at the reflux temperature for 22 hours. The solution is then cooled, made alkaline rapidly by addition of aqueous sodium hydroxide solution and diluted with water to a volume of about 220 ml. The resulting suspension of yellow crystals of 1-(p-aminophenacyl)-4-carbethoxy-4-phenylpiperidine is chilled to 0° C. and filtered. The solid is washed with water, dried, rewashed with two portions of cold ethanol and redried. It is then dissolved in 100 ml. of boiling absolute alcohol, treated with 0.4 gram of decolorizing charcoal and evaporated to a volume of about 60 ml. Chilling gives yellow crystals, which, when collected, washed and dried, melt, after transitions at 145° C., at 153–156° C.

EXAMPLE 6

*1-[2-(p-acetamidophenyl)-2-hydroxyethyl]-4-carbethoxy-4-phenylpiperidine*

To a solution of 4.1 grams of 1-(p-acetamidophenacyl)-4-carbethoxy-4-phenylpiperidine in 35 ml. of absolute ethanol is added a mixture of 3.5 ml. of 1 N sodium hydroxide solution and 13.5 ml. of water, followed by addition of 1 gram of sodium borohydride. The resulting mixture is refluxed for 15–20 minutes, and then cooled. Water (200 ml.) is added slowly with crystallization of the product occurring. The suspension is chilled to 0° C. then filtered, and the solid 1-[2-(p-acetamidophenyl) - 2 - hydroxyethyl - 4 - carbethoxy - 4 - phenylpiperidine washed with water and after drying, weighs 3.76 grams. It melts at 126.5–128.5° C.

EXAMPLE 7

*1-[2-(p-aminophenyl)-2-hydroxyethyl]-4-carbethoxy-4-phenylpiperidine*

A mixture of one gram of 1-(p-aminophenacyl)-4-carbethoxy-4-phenylpiperidine, 20 cc. of ethanol, 0.5 gram of sodium borohydride and 4 cc. of water is boiled on the steam bath for 20 minutes, during which time the ethanol largely evaporates. The residue is cooled and triturated with 50 ml. of water, giving a suspension of crystals of 1 - [2 - (p - aminophenyl)-2-hydroxyethyl]-4-carbethoxy-4-phenylpiperidine. The crystals are collected, washed with water and dried, melting point 104–112° C. The crude material is recrystallized from a mixture of 8 ml. of ethanol and 25 ml. of water and then melts at 105–115.5° C. A second recrystallization in a similar fashion gives product melting at 105–117° C.

EXAMPLE 8

*1-[2-p-aminophenyl)-2-ethoxyethyl]-4-carbethoxy-4-phenylpiperidine*

Two ml. of concentrated sulfuric acid is mixed with a solution of two grams 1-[2-(p-aminophenyl)-2-hydroxyethyl]-4-carbethoxy-4-phenylpiperidine in 20 ml. of absolute ethanol. The resulting mixture is refluxed for 15 hours at the end of this time the solution is cooled to about room temperature. The solution is then made strongly alkaline with 5% sodium hydroxide solution and sufficient water added to bring the total volume of the mixture to 75 ml. Crystals of 1-[2-(p-aminophenyl)-2-ethoxyethyl]-4-carbethoxy-4-phenylpiperidine are obtained by cooling the aqueous solution in an ice bath for several hours. The crystalline material is isolated by filtration and purified by recrystallization from about 15 ml. of ethanol and 30 ml. of water.

The dihydrochloride salt of 1-[2-(p-aminophenyl-2-ethoxyethyl]-4-carbethoxy-4-phenylpiperidine is obtained by dissolving the free base in the minimum amount of ether and adding to the ethereal solution as excess of ethanolic hydrogen chloride. The hydrochloride salt crystallizes directly.

EXAMPLE 9

*1-[2-(p-aminophenyl)-2-methoxyethyl]-4-carbomethoxy-4-phenylpiperidine*

0.5 gram of 1-[2-(p-acetamidophenyl)-2-hydroxyethyl]-4-carbomethoxy-4-phenylpiperidine is dissolved in 8 ml. of dry methanol. To this solution is added 0.5 ml. concentrated sulfuric acid and the whole refluxed for about 20 hours. At the end of this time the reaction mixture is cooled to about 20° C. and made basic with dilute aqueous sodium hydroxide. Sufficient water is added to bring the volume of the solution to about 20 ml. The 1-[2-(p-aminophenyl)-2-methoxyethyl]-4-carbomethoxy-4-phenylpiperidine is crystallized by cooling said solution to about 5° C. in an ice bath. The crystals are isolated by filtration and the free base is converted, without further purification, to the hydrochloride salt by dissolving the base in a small amount of ethyl ether and adding methanolic hydrogen chloride to the ether solution.

The starting material employed in this example is obtained by the procedures set forth in Examples 4 and 6 hereinabove employing 4-carbomethoxy-4-phenylpiperidine as one of the reactants in the procedure of Example 4. The 4-carbomethoxy-4-phenylpiperidine is prepared as follows: Seven grams of N-tosyl-4-carboxy-4-phenylpiperidine is added to the solution of 5 ml. of concentrated sulfuric acid and 25 ml. of methanol. The solution is refluxed for three and one-half hours and then poured into 150 ml. of cold water. An excess of 30% sodium hydroxide solution is added and the resulting mixture extracted with three 50 ml.-portions of ether. The combined ether extracts are dried over magnesium sulfate and excess hydrogen chloride is then added to the ether. The 4-carbomethoxy-4-phenylpiperidine hydrochloride which precipitates is filtered, washed with ether and dried. The free base is obtained by treating a solution of the hydrochloride with excess base.

Any departure from the above description which conforms to the present invention is intended to be included within the scope of the claims.

What is claimed is:

1. A member of the group consisting of a compound having the formula—

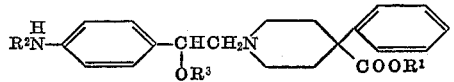

wherein $R^1$ and $R^3$ are lower alkyl groups and $R^2$ is selected from the class consisting of hydrogen and lower alkanoyl groups, and non-toxic acid addition salts thereof.

2. 1-[2-(p-aminophenyl)-2-ethoxyethyl]-4-carbethoxy-4-phenylpiperidine dihydrochloride.

3. 1-[2-(p-aminophenyl)-2-ethoxyethyl]-4-carbethoxy-4-phenylpiperidine.

4. 1-[2-(p-aminophenyl)-2 - methoxyethyl] - 4 - carbomethoxy-4-phenylpiperidine.

5. 1-[2-(p-acetamidophenyl)-2-ethoxyethyl]-4-carbethoxy-4-phenylpiperidine.

6. 1-[2-p-formamidophenyl)-2-ethoxyethyl]-4-carbethoxy-4-phenylpiperidine.

7. 1-[2-(p-acetamidophenyl)-2-ethoxyethyl]-4-carbethoxy-4-phenylpiperidine hydrochloride.

8. The process which comprises heating a compound having the formula

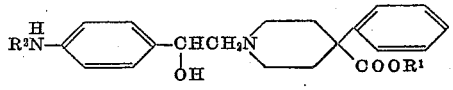

in a lower alkanol in the presence of a strong mineral acid thereby producing an acid addition salt of a compound of the formula

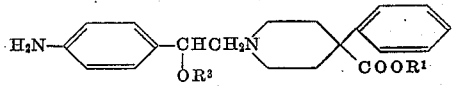

wherein $R^1$ and $R^3$ are lower alkyl groups and $R^2$ is selected from the class consisting of hydrogen and lower acyl radicals.

9. The process which comprises heating 1-[2-(p-acetamidophenyl)-2-hydroxyethyl]-4-carbethoxy - 4 - phenylpiperidine in ethanol in the presence of a strong mineral acid to produce an acid addition salt of 1-[2-(p-aminophenyl)-2-ethoxyethyl]-4-carbethoxy-4-phenylpiperidine.

10. The process of claim 9 wherein the acid is sulfuric acid.

11. The process which comprises heating 1-[2-(p-aminophenyl)-2-hydroxyethyl]-4-carbethoxy - 4 - phenylpiperidine in ethanol in the presence of a strong mineral acid to produce an acid addition salt of 1-[2-(p-aminophenyl)-2-ethoxyethyl]-4-carbethoxy-4-phenylpiperidine.

12. The process which comprises heating 1-[2-(p-formamidophenyl) - 2 - hydroxyethyl] - 4 - carbethoxy-4-phenylpiperidine in ethanol in the presence of a strong mineral acid to produce an acid addition salt of 1-[2-(p-aminophenyl)-2 - ethoxyethyl]-4-carbethoxy - 4 - phenylpiperidine.

13. The process which comprises heating 1-[2-(p-aminophenyl) - 2 - hydroxyethyl] - 4 - carbomethoxy - 4-phenylpiperidine in methanol in the presence of a strong mineral acid to produce an acid addition salt of 1-[2-(p-aminophenyl) - 2 - methoxyethyl] - 4 - carbomethoxy - 4-phenylpiperidine.

References Cited in the file of this patent

UNITED STATES PATENTS 2,529,982    Walter _____ Nov. 14, 1950